(12) United States Patent
Mordukhovich

(10) Patent No.: US 9,360,053 B2
(45) Date of Patent: Jun. 7, 2016

(54) FRICTION PLATE FOR A FRICTION CLUTCH PACK

(75) Inventor: Gregory Mordukhovich, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 432 days.

(21) Appl. No.: 13/297,328

(22) Filed: Nov. 16, 2011

(65) Prior Publication Data

US 2013/0118858 A1    May 16, 2013

(51) Int. Cl.
F16D 13/72 (2006.01)
F16D 69/00 (2006.01)
F16D 13/64 (2006.01)
F16D 13/52 (2006.01)
F16D 55/36 (2006.01)
F16D 65/853 (2006.01)

(52) U.S. Cl.
CPC .............. *F16D 13/52* (2013.01); *F16D 13/64* (2013.01); *F16D 13/72* (2013.01); *F16D 55/36* (2013.01); *F16D 65/853* (2013.01); *F16D 2069/004* (2013.01); *F16D 2069/007* (2013.01)

(58) Field of Classification Search
USPC ...................................................... 192/113.36
See application file for complete search history.

(56) References Cited

U.S. PATENT DOCUMENTS

| | | | | |
|---|---|---|---|---|
| 2,554,548 A | * | 5/1951 | Albagnac | 188/251 R |
| 4,202,432 A | * | 5/1980 | Komori | 192/107 M |
| 5,676,577 A | | 10/1997 | Lam et al. | |
| 6,899,783 B2 | * | 5/2005 | Oguri et al. | 156/259 |
| 7,886,885 B2 | | 2/2011 | Mordukhovich | |
| 8,157,071 B2 | * | 4/2012 | Mordukhovich | 192/52.6 |
| 2008/0099301 A1 | | 5/2008 | Mordukhovich | |
| 2009/0000899 A1 | * | 1/2009 | Paterra et al. | 192/70.14 |
| 2009/0211867 A1 | | 8/2009 | Miyazaki | |

* cited by examiner

*Primary Examiner* — Mark Manley

(57) ABSTRACT

A clutch is configured to transfer torque between a first element and a second element. The first element is coupled to a reaction plate and the second element is coupled to a friction plate disposed opposite the reaction plate. The friction plate includes a plate element, a friction layer, and a plurality of compressible members. The friction layer is fixedly attached to the plate element and defines a plurality of grooved voids. The compressible members are disposed in the grooved voids of the friction layer and fixedly attached to the plate element.

14 Claims, 4 Drawing Sheets

FRICTION PLATE FOR A FRICTION CLUTCH PACK

TECHNICAL FIELD

This disclosure relates to torque transfer devices including clutches and brakes.

BACKGROUND

The statements in this section merely provide background information related to the present disclosure. Accordingly, such statements are not intended to constitute an admission of prior art.

Clutch devices are employed in transmissions and other devices to transfer torque between elements when a compressive force is applied. Known clutch devices include a friction plate, an opposing reaction plate, and a mechanism configured to apply compressive force. Known friction plates include a surface layer of friction material that engages a surface of the reaction plate upon application of the compressive force. Friction materials may include a cellulose/aramid/resin-based material, a sintered metallic fiber material, a woven carbon fiber material, or another suitable material. Clutch configurations include wet clutch friction plate systems wherein lubricating fluid, e.g., automatic transmission fluid, is employed between the surfaces of the friction plate and the reaction plate for purposes of cooling and lubrication. Wet clutch configurations include multiple plate systems wherein each clutch configuration includes a plurality of friction plates and reaction plates alternately arranged. Known design considerations associated with wet clutch configurations include clutch torque transfer capacity and material properties of the friction material including coefficient of friction, compressibility and elastic deformation, heat capacity, heat transfer capability, permeability, and abrasive wear capability. Operating considerations associated with wet clutch configurations include localized heating and hot-spotting, shudder, material glazing, and structural friction material damage, each which affects transmission fluid service life, clutch service life and clutch performance. Friction plates may employ a compressible resilient friction layer having a groove for fluidic flow.

SUMMARY

A clutch is configured to transfer torque between a first element and a second element. The first element is coupled to a reaction plate and the second element is coupled to a friction plate disposed opposite the reaction plate. The friction plate includes a plate element, a friction layer, and a plurality of compressible members. The friction layer is fixedly attached to the plate element and defines a plurality of grooved voids. The compressible members are disposed in the grooved voids of the friction layer and fixedly attached to the plate element.

BRIEF DESCRIPTION OF THE DRAWINGS

One or more embodiments will now be described, by way of example, with reference to the accompanying drawings, in which:

FIGS. 3-1 and 3-2 illustrate cross-sectional cutaway views of embodiments of exemplary friction plates and corresponding reaction plates without applied clutch pressure, in accordance with the disclosure;

DETAILED DESCRIPTION

Figure 1:
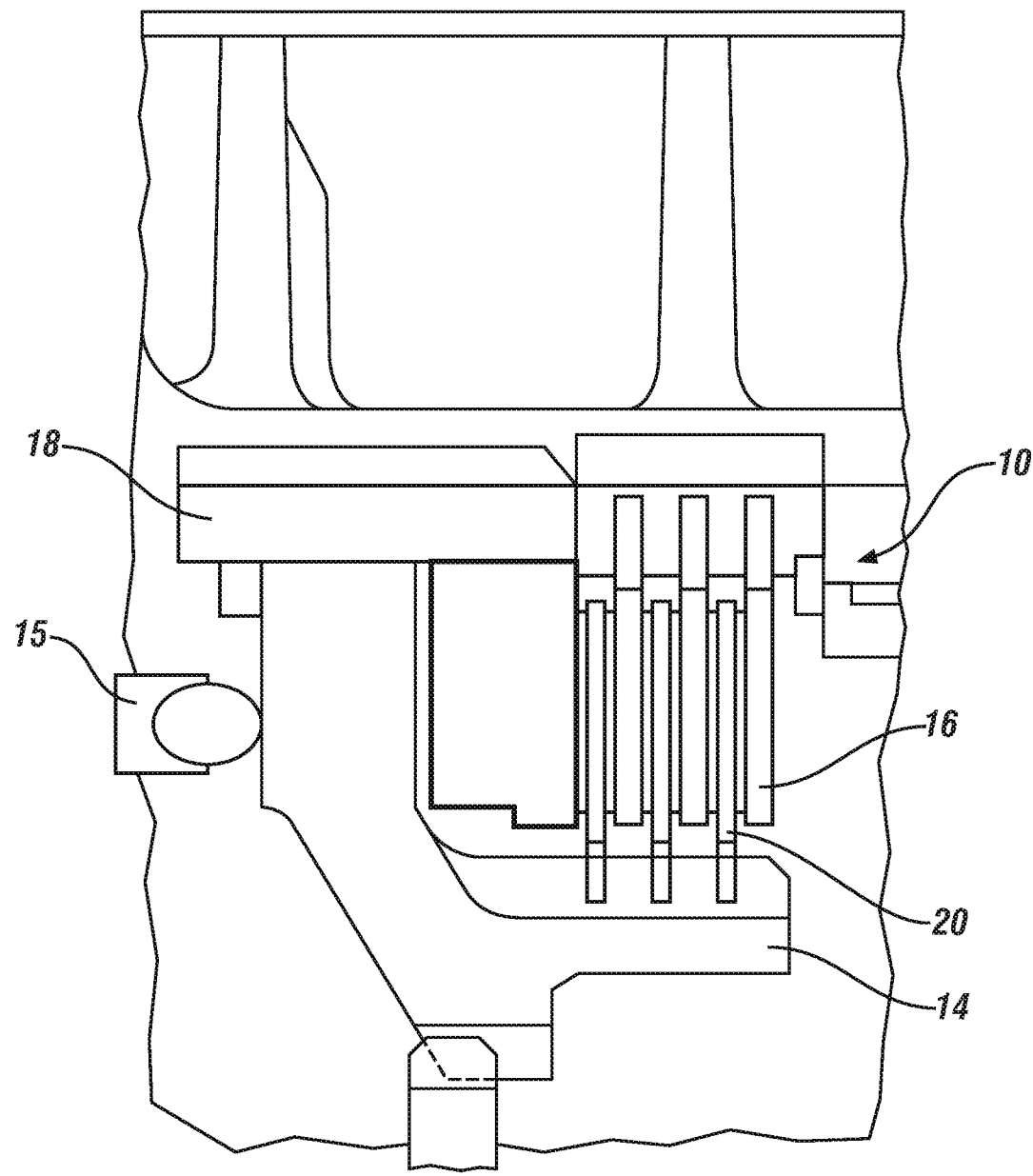
FIG. 1 schematically illustrates a partial side view of an exemplary wet friction clutch pack including a plurality of friction plates and corresponding reaction plates, in accordance with the disclosure.

Referring now to the drawings, wherein the showings are for the purpose of illustrating certain exemplary embodiments only and not for the purpose of limiting the same, FIG. 1 schematically illustrates a partial side view of a friction clutch pack 10 including a plurality of friction plates 20 mechanically coupled to a first rotatable element 14 and a corresponding opposing plurality of reaction plates 16 mechanically coupled to a second element 18. The opposing first and second elements 16, 18 are preferably coaxial, and the second element 18 may be either a brake element coupled to a case or a rotatable element, e.g., a rotatable element of a planetary gear set. The friction clutch pack 10 is preferably employed for torque transfer in a transmission device, although the disclosure is not so limited. In one embodiment, a solenoid-operated hydraulic actuator 15 is configured to control flow of pressurized hydraulic fluid to apply compressive force in the form of applied clutch pressure to activate and deactivate the friction clutch pack 10. In a first state, the solenoid-operated hydraulic actuator 15 employs hydraulic pressure to urge the friction plates 20 towards the reaction plates 16 to interfere therewith, thus effecting torque transfer. In a second state, the solenoid-operated hydraulic actuator 15 releases the hydraulic pressure, permitting the friction plates 20 to move away from the reaction plates 16 to deactivate the friction clutch pack 10 and discontinue torque transfer thereacross. As illustrated, the friction clutch pack 10 employs multiple friction plates 20 and multiple reaction plates 16. The complement of friction plates 20 and reaction plates 16 of the friction clutch pack 10 depend upon factors related to clutch design and torque transfer demands. The friction plates 20 and reaction plates 16 are each flat, annular-shaped plates fabricated from steel or another suitable material. The friction clutch pack 10 is configured as a wet clutch friction plate system wherein lubricating fluid 30, e.g., automatic transmission fluid is employed between the surfaces of the friction plate 20 and the reaction plate 16 for purposes of cooling and lubrication. In one embodiment, the solenoid-operated hydraulic actuator 15 may be configured with a dual-acting solenoid-operated hydraulic actuator or similar device to apply compressive force to effect interference between the friction plates 20 and either of opposed reaction plates 16.

Figure 2:
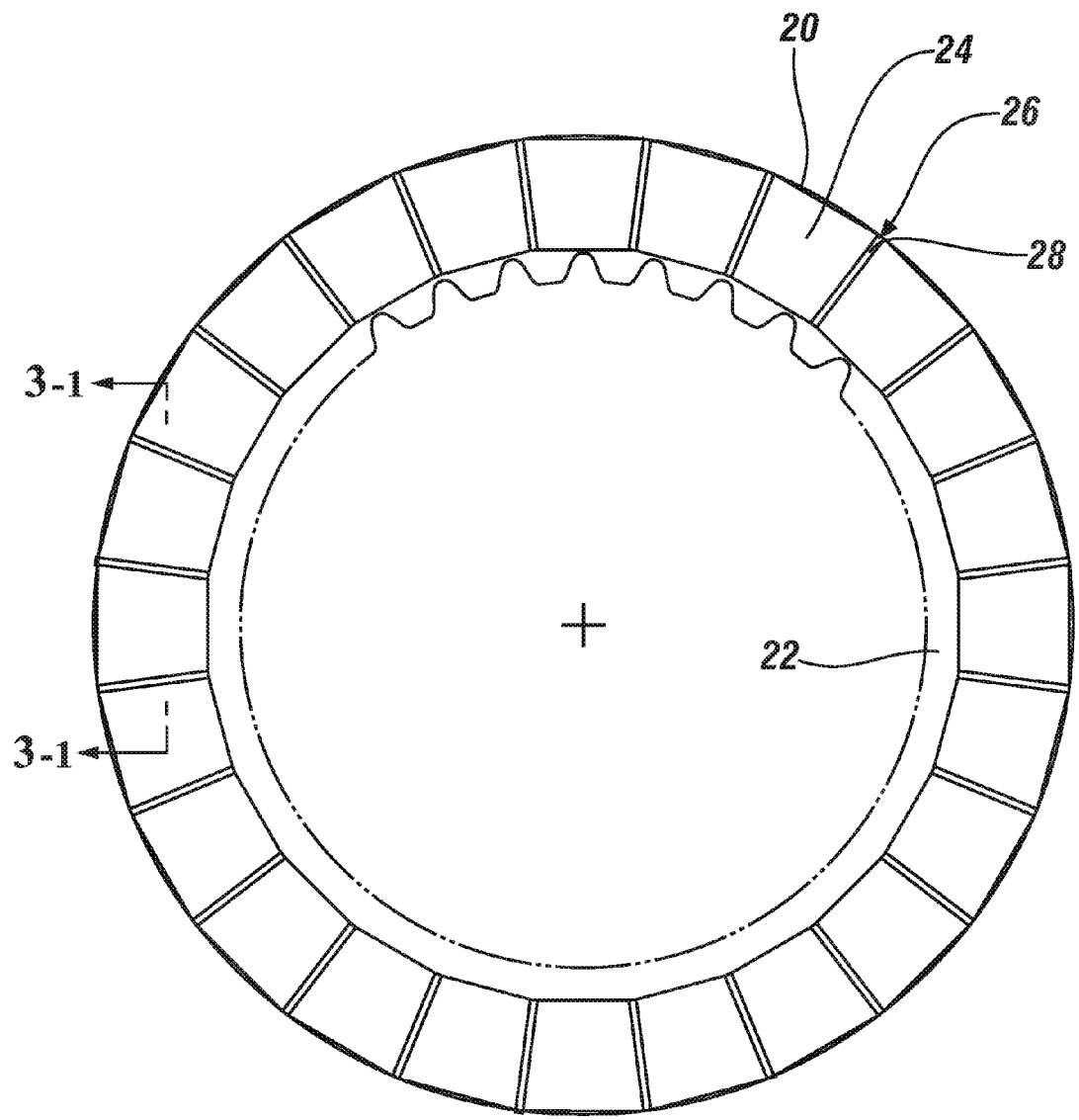
FIG. 2 illustrates a front view of an exemplary friction plate, in accordance with the disclosure.

FIG. 2 illustrates a front view of an exemplary friction plate 20, which includes an annular-shaped plate element 22, a friction layer 24, a plurality of grooved voids 26, and a plurality of compressible members 28 fixedly attached to the plate element 22 in the grooved voids 26. The friction layer 24 is fabricated from friction material that is attached to the plate element 22 at a suitable thickness in accordance with design specifications. The friction material may include a cellulose/aramid/resin-based material, a sintered metallic fiber material, a woven carbon fiber material, or other material. The friction layer 24 may be attached to a single side of the plate element 22, or to both sides of the plate element 22. Flow paths are formed in the grooved voids 26 through the friction layer 24 between an inner periphery and an outer periphery of the friction plate 20, with cross-sections of the flow paths defined between the compressible members 28 and the reaction plate 16. The flow paths permits flow of fluid 30 between the friction plate 20 and the reaction plate 16 for purposes of cooling and lubrication. Each of the grooved voids 26 is formed in the friction layer 24 and is preferably completely void of the friction material from the friction layer 24. As shown, each of the grooved voids 26 is radially oriented. Alternatively, the grooved voids 26 may be chordic to provide non-radially oriented flow paths through the friction layer 24 between the inner periphery and the outer periphery of the friction plate 20. Compressible members 28 are inserted in the grooved voids 26 and attached directly to the plate element 22. Each compressible member 28 may have a rectangular cross-sectional shape, or, alternatively, a triangular cross-sectional shape, a hemispheric cross-sectional shape, or other cross-sectional shape without limitation. Each compressible member 28 is fabricated from material having a substantially lower compressibility and a lower coefficient of friction than the material of the friction layer 24. By way of example, compressibility of the material of the compressible member 28 is an order of magnitude less than the compressibility of the material of the friction layer 24. As appreciated by those having ordinary skill in the art, compressibility indicates a measure of change in material thickness in response to an applied normal force, preferably within elastic deformation limits of the material. In one embodiment, each compressible member 28 is fabricated from carbon-based materials, e.g., porous carbon/carbon matrix or woven carbon fiber and the friction layer 24 is fabricated from cellulose-based friction material. The compressible members 28 are preferably attached to the plate element 22 using an adhesive material that bonds the materials together. Suitable adhesive material may include a phenolic resin adhesive or another thermosetting polymer similar to that which is employed for attaching the friction layer 24 to the plate element 22. In one embodiment, the compressible members 28 are attached to the plate element 22 prior to attaching and bonding the friction layer 24 to the plate element 22 in order to use the compressible members 28 to determine thickness of the friction layer 24. In one embodiment the compressible members 28 are inserted and interwoven with the friction layer 24 prior to attachment to the plate element 22. A common bonding process may be employed to attach the interwoven compressible members 28 and friction layer 24 to the plate element 22. Alternatively, mechanical fasteners, e.g., rivets may be employed to attach the compressible members 28 to the plate element 22, with the mechanical rivets countersunk into the compressible members 28 in a manner that prevents interaction between the rivets and the opposite reaction plate 16 when the friction clutch pack 10 is activated with compressive force fully applied. In one embodiment, the friction plate may employ both the compressible members 28 and non-compressible members, e.g., members fabricated from steel, with the compressible members 28 and non-compressible members attached in an alternating or other manner around the circumference of the plate element 22. The compressible members 28 and the non-compressible members may be attached to the plate element 22 using an adhesive material. A friction clutch pack employing only non-compressible members 28 may include attaching the non-compressible members to the plate element 22 using the adhesive material. A flow path is formed in the grooved voids 26 through the friction layer 24 between an inner periphery and an outer periphery of the friction plate 20, with a flow path cross-section defined between the compressible members 28 and the reaction plate 16.

Figures 1, 3:
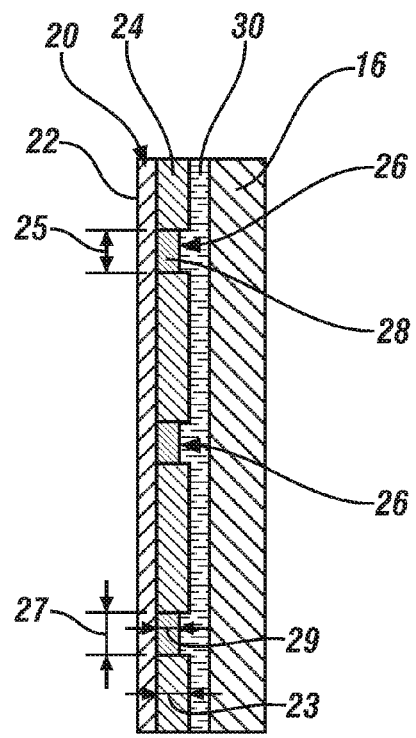
Figures 2, 3:
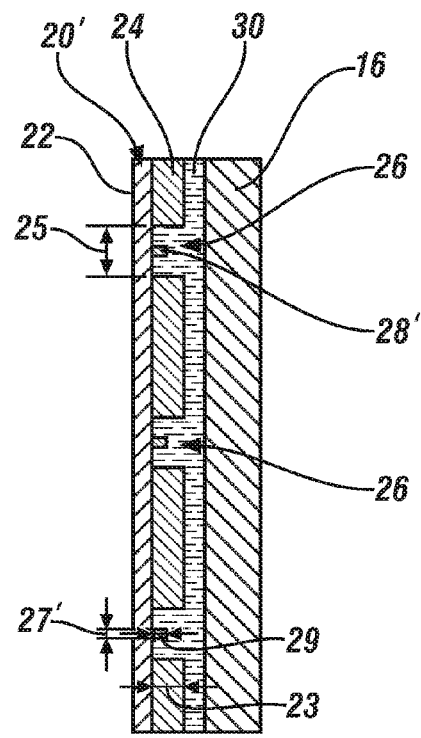

FIG. 3-1 illustrates a cross-sectional cutaway view of an embodiment of the single friction plate 20 and corresponding single reaction plate 16 without applied clutch pressure with fluid 30 disposed therebetween. The friction plate 20 includes the plate element 22, the friction layer 24 and grooved voids 26. Compressible members 28 are disposed in the grooved voids 26 and attached to the plate element 22 as previously described. As shown, the friction clutch pack 10 is deactivated. The friction layer 24 has a first thickness 23, and the grooved voids 26 are each at a preset width 25. The compressible members 28 are fabricated to have an uncompressed thickness 29 that is less than the uncompressed thickness 23 of the friction layer 24, thus creating a channel for fluidic flow of the fluid 30. In this embodiment, the compressible members 28 are each of a width 27 that is substantially equal to the preset width 25 of the grooved voids 26.

FIG. 3-2 illustrates a cross-sectional cutaway view of another embodiment of a single friction plate 20' and a corresponding single reaction plate 16 without applied clutch pressure with fluid 30 disposed therebetween. The friction plate 20' includes the plate element 22, the friction layer 24 and grooved voids 26. Compressible members 28' are disposed in the grooved voids 26 and attached to the plate element 22. As shown, the friction clutch pack 10 deactivated. The friction layer 24 has uncompressed thickness 23 and the grooved voids 26 are each at a preset width 25. The compressible members 28' are fabricated with an uncompressed thickness 29 that is less than the uncompressed thickness 23 of the friction layer 24, creating a channel for fluidic flow of the fluid 30. In this embodiment, the compressible members 28' are each of a width 27' that is less than the preset width 25 of the grooved voids 26. As shown, each of the compressible members 28' has a rectangular cross-section. Alternatively, the compressible members 28' may have a triangular cross-section, a hemispheric cross-section, or other cross-section shape without limitation. Pertinent design factors for the friction plate 20 including the friction layer 24, grooved voids 26, and compressible members 28 includes considerations for absolute and relative compressibilities of the materials of the friction layer 24 and the compressible members 28 and fluidic flow and heat transfer between the compressible members 28 and a corresponding reaction plate 16.

Figure 4:
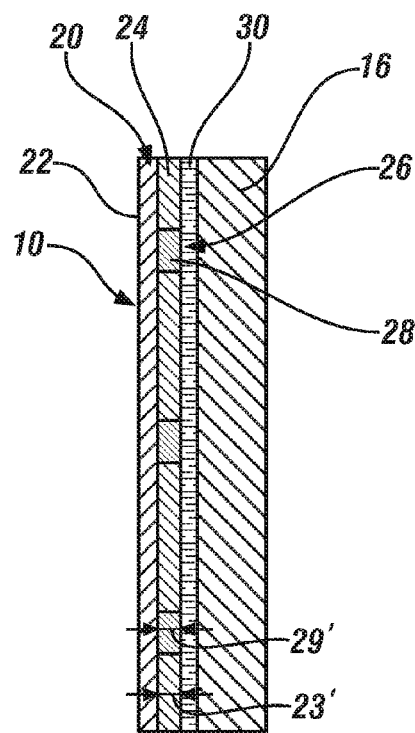
FIGS. 4 and 5 illustrate cross-sectional cutaway views of an embodiment of the exemplary friction plate and corresponding reaction plate with applied clutch pressure, in accordance with the disclosure.

FIG. 4 shows a cross-sectional cutaway view of an embodiment of the friction clutch pack 10 including the single friction plate 20 and the single reaction plate 16 with fluid 30 disposed therebetween. The friction plate 20 includes the plate element 22, the friction layer 24 and three grooved voids 26. Compressible members 28 are disposed in the grooved voids 26 and attached to the plate element 22. As shown, compressive force is applied with the friction clutch pack 10 activated and the friction clutch pack 10 is operating at a high rate of rotational speed. Slip may occur between the friction plate 20 and reaction plate 16. The compressible members 28 each have a compressed thickness 29' that is slightly less than a compressed thickness 23' of the friction layer 24. As such, torque transfer between the friction plate 20 and the reaction plate 16 is propagated primarily through the friction layer 24.

Figure 5:
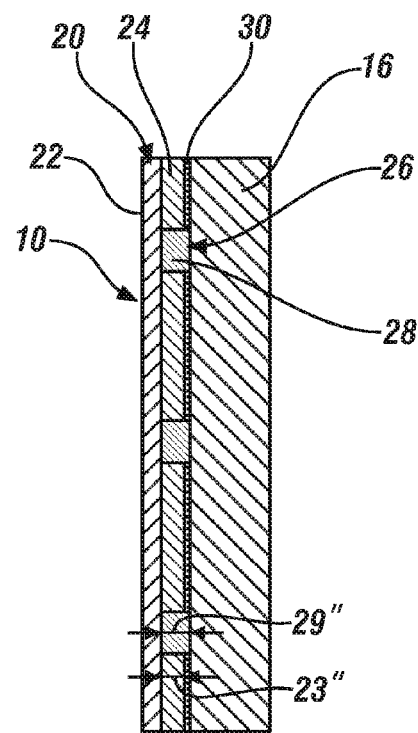

FIG. 5 shows a cross-sectional cutaway view of an embodiment of the friction clutch pack 10 including the single friction plate 20 and the single reaction plate 16 with fluid 30 disposed therebetween. The friction plate 20 includes the plate element 22, the friction layer 24 and three grooved voids 26. Compressible members 28 are disposed in the grooved voids 26 and are attached to the plate element 22. As shown, compressive force is applied with the friction clutch pack 10 activated and the friction clutch pack 10 is operating at a low rate of rotational speed. Slip may occur between the friction plate 20 and reaction plate 16. The compressible members 28 each have a compressed thickness 29" that is slightly greater than a compressed thickness 23" of the friction layer 24. As such, torque transfer between the friction plate 20 and the reaction plate 16 is being propagated primarily through the compressible members 28.

Figure 6:
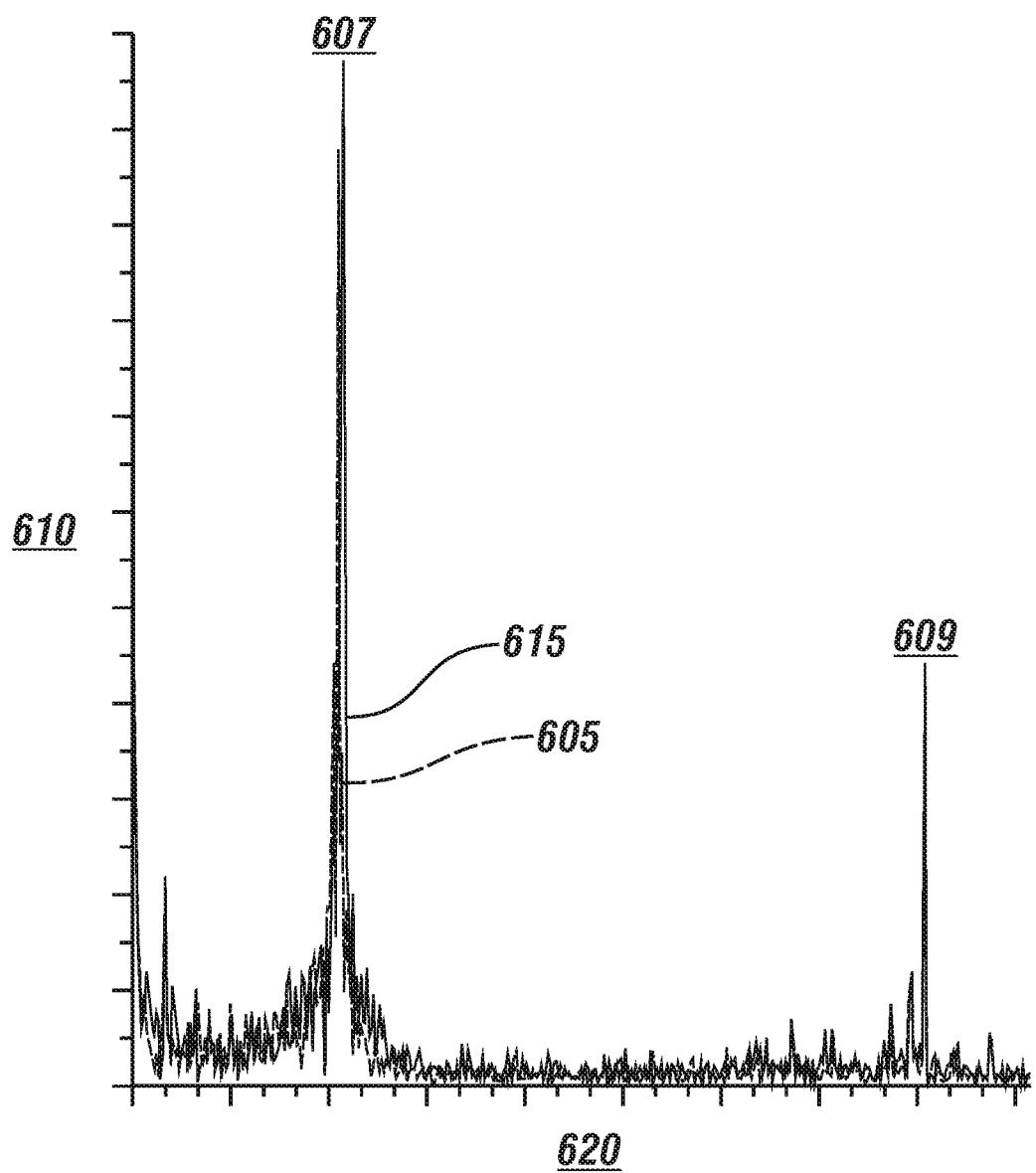
FIG. 6 graphically shows expected results from a frequency-based spectral analysis of torque vibration data associated with operation of an embodiment of a friction clutch pack employing an embodiment of the exemplary friction plate, in accordance with the disclosure.

FIG. 6 graphically shows expected results from a frequency-based spectral analysis of torque vibration data associated with operation of an embodiment of the friction clutch pack 10 employing the friction plate 20 described herein in comparison with an analogous friction clutch pack employing a known friction plate. The depicted data indicates expected results based upon analysis of analogous data using known simulation methods, and includes an amplitude of torque vibration (Nm) on the vertical axis 610 in relation to frequency (Hz) on the horizontal axis 620. Data includes the first torque vibration data 605 depicting operation of the embodiment of the friction clutch pack 10 and second torque vibration data 615 depicting operation of the known friction plate, including operation at frequencies known to induce shudder. Data points of interest include step frequency 607 corresponding to a step input, e.g., initially applying the clutch and a system-related frequency 609. The results indicate that the first torque vibration data 605 depicting operation of the embodiment of the friction clutch pack 10 is expected to be substantially less than the second torque vibration data 615 at the system-related frequency 609, and is expected to be practically imperceptible. The results further indicate that the first torque vibration data 605 depicting operation of the embodiment of the friction clutch pack 10 is expected to be less than the second torque vibration data 615 at the step frequency 607.

An embodiment of the friction clutch pack 10 including friction plates 20 employing compressible members 28 disposed in grooved voids 26 may be implemented in a manner that controls permeability of the material of the friction layer 24, including controlling the compression of the friction layer 24 within elastic deformation limits of the friction material thereof. The compressible members 28 disposed in the grooved voids 26 may serve to dampen vibration during contact with the reaction plate 16 due to the fluid film therebetween, and may eliminate a need for a transmission vibration damper on specific powertrain applications, e.g., turbocharged systems and three-cylinder engines. The compressible members 28 disposed in the grooved voids 26 may provide porous positive stops to limit compression of the friction layer 24. The compressible members 28 disposed in the grooved voids 26 may be configured to maximize torque transfer at clutch engagement and during clutch slip, providing additional torque transfer. Use of friction plates 20 employing an embodiment of the compressible member 28 fabricated from material having a substantially lower compressibility and a lower coefficient of friction than the material of the friction layer 24 may extend service life of the fluid 30 as compared to a compressible member fabricated from ferrous materials.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A clutch configured to transfer torque between a first element and a second element, comprising:
    the first element coupled to a reaction plate;
    the second element coupled to a friction plate disposed opposite the reaction plate; and
    the friction plate comprising a single plate element, a friction layer, and a plurality of compressible members, said friction layer fixedly attached to the single plate element and defining a plurality of grooved voids, said compressible members disposed in the grooved voids of the friction layer and fixedly attached to the single plate element;
        each grooved void leaving a space between friction layer segments void of the friction layer and comprising a rectangularly-shaped cross-section, each grooved void having a constant preset width formed in the friction layer and oriented between an inner circumferential periphery and an outer circumferential periphery of the plate; and
        each compressible member comprising a compressibility lower than a compressibility of the friction layer and positioned within the space between friction layer segments extending in the grooved void between the inner circumferential periphery and the outer circumferential periphery of the plate and having a constant maximum width less than the constant preset width of the grooved void defining a void between an outer side of the compressible member and a side of the friction layer adjacent to the outer side of the compressible member, wherein the compressible members comprise an uncompressed thickness less than an uncompressed thickness of the friction layer and a compressed thickness less than a compressed thickness of the friction layer during operation of the clutch in an activated state and in a high speed slip condition comprising an operating state wherein the clutch is applying a compressive force between the reaction plate and the friction plate prior to the reaction plate making contact with the compressible members, such that a transfer of torque between the friction plate and the reaction plate is propagated primarily through the friction layer;
        wherein said uncompressed thickness of the compressible member is determined to control permeability of the friction layer and to control the compression of the friction layer within a set of elastic deformation limits of the friction layer material.

2. The clutch of claim 1, wherein the compressible members comprise a compressibility an order of magnitude less than compressibility of the friction layer and a lower coefficient of friction than the friction layer.

3. The clutch of claim 1, wherein the compressible members are fabricated from one of a porous carbon/carbon matrix and a woven carbon fiber and the friction layer is fabricated from a cellulose-based material.

4. The clutch of claim 1, further comprising a fluidic lubricant disposed between the friction plate and the reaction plate.

5. The clutch of claim 1, wherein the grooved voids are radially-oriented.

6. The clutch of claim 1, wherein the grooved voids are chordic-oriented.

7. A friction plate employable in a wet friction clutch configuration, comprising:

a single plate element, a friction layer, and a plurality of compressible members, said friction layer fixedly attached to the single plate element and defining a plurality of grooved voids, said compressible members disposed in the grooved voids of the friction layer and fixedly attached to the single plate element;

each grooved void leaving a space between friction layer segments void of the friction layer and comprising a rectangularly-shaped cross-section, each grooved void having a constant preset width formed in the friction layer and oriented between an inner circumferential periphery and an outer circumferential periphery of the plate; and each compressible member comprising a compressibility lower than a compressibility of the friction layer and positioned within the space between friction layer segments extending in the grooved void between the inner circumferential periphery and the outer circumferential periphery of the plate and having a constant maximum width less than the constant preset width of the grooved void defining a void between an outer side of the compressible member and a side of the friction layer adjacent to the outer side of the compressible member, wherein the compressible members comprise an uncompressed thickness less than an uncompressed thickness of the friction layer and a compressed thickness less than a compressed thickness of the friction layer during operation of the clutch in an activated state and in a high speed slip condition comprising an operating state wherein the clutch is applying a compressive force between the reaction plate and the friction plate prior to the reaction plate making contact with the compressible members, such that a transfer of torque between the friction plate and the reaction plate is propagated primarily through the friction layer;

wherein said uncompressed thickness of the compressible member is determined to control permeability of the friction layer and to control the compression of the friction layer within a set of elastic deformation limits of the friction layer material.

8. The friction plate of claim 7, wherein the compressible members comprise a compressibility an order of magnitude less than compressibility of the friction layer and a lower coefficient of friction than the friction layer.

9. The friction plate of claim 7, wherein the compressible members are fabricated from one of a porous carbon/carbon matrix and a woven carbon fiber and the friction layer is fabricated from a cellulose-based material.

10. The clutch of claim 7, wherein the grooved voids are radially-oriented.

11. The clutch of claim 7, wherein the grooved voids are chordic-oriented.

12. The friction plate of claim 7, wherein the compressible members comprise a rectangular cross-sectional shape.

13. The friction plate of claim 7, wherein the compressible members comprise a triangular cross-sectional shape.

14. The friction plate of claim 7, wherein the compressible members are attached to the plate element with an adhesive.

\* \* \* \* \*